(12) United States Patent
Kawamura et al.

(10) Patent No.: US 7,769,531 B2
(45) Date of Patent: Aug. 3, 2010

(54) CONTROL DEVICE OF INTERNAL COMBUSTION ENGINE

(75) Inventors: Jun Kawamura, Chita-gun (JP); Masakuni Yokoyama, Tokai (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 12/430,169

(22) Filed: Apr. 27, 2009

(65) Prior Publication Data

US 2009/0266335 A1    Oct. 29, 2009

(30) Foreign Application Priority Data

Apr. 28, 2008    (JP) ............... 2008-117458

(51) Int. Cl.
*F02D 41/26* (2006.01)
(52) U.S. Cl. ............... 701/105; 701/109; 123/305; 123/672; 123/406.47
(58) Field of Classification Search ......... 701/103–105, 701/108–109; 123/568.11, 406.47, 672, 123/305, 299; 60/285–286
See application file for complete search history.

(56) References Cited

U.S. PATENT DOCUMENTS

| | | | |
|---|---|---|---|
| 6,687,598 B2* | 2/2004 | Oota et al. ............... 701/104 |
| 6,990,801 B2* | 1/2006 | Kitahara ............... 60/285 |
| 7,007,462 B2* | 3/2006 | Kitahara ............... 60/285 |
| 7,201,138 B2* | 4/2007 | Yamaguchi et al. ......... 123/305 |
| 7,296,556 B2* | 11/2007 | Yamaguchi et al. ......... 123/305 |
| 7,444,984 B2* | 11/2008 | Yamaguchi et al. .... 123/406.47 |
| 2005/0022517 A1 | 2/2005 | Miura |

FOREIGN PATENT DOCUMENTS

JP    2009-264337    * 11/2009

* cited by examiner

*Primary Examiner*—Hai H Huynh
(74) *Attorney, Agent, or Firm*—Nixon & Vanderhye PC

(57) ABSTRACT

A control device of an internal combustion engine calculates ignition delays in lean combustion and rich combustion, standardizes the ignition delays based on ignition timing, and further standardizes the ignition delays based on injection quantity and injection timing of pilot injection respectively. The control device calculates a present ignition delay by linear interpolation of the standardized ignition delays in the lean combustion and the rich combustion. Moreover, the control device corrects the present ignition delay with the ignition timing and further corrects the present ignition delay with the injection quantity and the injection timing of the pilot injection. The control device calculates a command value of the injection timing by subtracting the corrected present ignition delay from target ignition timing.

8 Claims, 5 Drawing Sheets

CONTROL DEVICE OF INTERNAL COMBUSTION ENGINE

CROSS REFERENCE TO RELATED APPLICATION

This application is based on and incorporates herein by reference Japanese Patent Application No. 2008-117458 filed on Apr. 28, 2008.

BACKGROUND OF THE INVENTION

1. Field of the Invention

The present invention relates to a control device of an internal combustion engine.

2. Description of Related Art

An internal combustion engine such as a diesel engine that basically performs lean combustion at an air-fuel ratio higher than the theoretical air-fuel ratio frequently switches combustion to rich combustion at an air-fuel ratio equal to or lower than the theoretical air-fuel ratio. For example, in the case where an exhaust pipe is equipped with a NOx catalyst (LNT: a lean NOx trap) to purify nitrogen oxides (NOx) discharged from the engine, the NOx is occluded to the LNT under a lean atmosphere. Then, after an interval, the atmosphere is switched to a rich atmosphere to reduce the occluded NOx to harmless nitrogen. Also in the case of the lean combustion as the basic combustion, there is a possibility that the air-fuel ratio deviates from the target to the rich side when intake system control cannot be performed suitably during acceleration or the like, for example.

When the combustion is switched from the lean combustion to the rich combustion, an opening degree of an intake throttle is reduced and a valve for exhaust gas recirculation (EGR) is opened, thereby suddenly changing intake system targets such as an air excess ratio. In this case, intake system controlled variables such as the air excess ratio do not necessarily follow the targets immediately. Rather, there is a transition period, so ignition timing can largely deviate from an adjusted state. If the ignition timing deviates largely from the adjusted state to the advanced side of the optimum ignition timing, the combustion progresses excessively, thereby causing problems such as a noise and excessive torque, for example. If the ignition timing deviates largely to the delayed side of the optimum ignition timing, for example, problems such as a misfire, increase of unburned fuel in the exhaust gas or insufficient torque can occur. The above phenomena can occur also when the deviation of the air-fuel ratio occurs during the acceleration.

With regard to this problem, Patent document 1 (JP-A-2005-48724) describes a technology that calculates present injection timing by interpolating the injection timing in the rich combustion and the injection timing in the lean combustion in accordance with the air excess ratio of every moment in a transient state where the combustion switches from the lean combustion to the rich combustion. Patent document 1 states that the appropriate injection timing can be calculated by the above method to cause the ignition timing to follow the target value.

FIG. 6 shows an example of temporal transitions of (a) the opening degree of the intake throttle, (b) the opening degree of the EGR valve, (c) the air excess ratio, (d) an injection timing command value and (e) the ignition timing of the technology of Patent document 1. The combustion is switched from the lean combustion to the rich combustion at time t0 as shown in FIG. 6. As the combustion is switched from the lean combustion to the rich combustion, the intake throttle opening degree is decreased as shown in part (a) of FIG. 6 and the EGR valve opening degree is increased as shown in part (b) of FIG. 6. Thus, the intake air is restricted and the recirculated exhaust flow rate increases, so the air excess ratio decreases gradually as shown in part (c) of FIG. 6.

With the method of Patent document 1, the injection timing command value of every moment is calculated as shown in part (d). It is known that the rich combustion has a high tendency to cause incomplete combustion, thereby increasing emission of soot from the engine. Therefore, in some cases, the target ignition timing is delayed in the rich combustion to provide a sufficient time from the injection timing to the ignition timing such that the fuel is sufficiently mixed with the air and the incomplete combustion is avoided. The target value of the ignition timing is set on the delayed side also in the example of FIG. 6. However, in the example of the conventional technology shown in FIG. 6, the actual ignition timing shown by a solid line in part (e) is not delayed fully to the target value shown by a broken line in part (e).

It is regarded that the problem shown in FIG. 6 is caused because the command value of the injection timing in the transient state is not calculated appropriately. The technology of Patent document 1 calculates the fuel injection timing in the transient state by interpolating the fuel injection timing in the lean combustion and the fuel injection timing in the rich combustion using only the air excess ratio. However, the information of the air excess ratio is not the only factor related to the calculation of the optimum fuel injection timing. According to knowledge of the inventors, it is necessary to take following factors into account in order to accurately calculate the appropriate fuel injection timing in the situation where the in-cylinder oxygen quantity and the like change suddenly.

First, it should be taken into account that the ignition delay differs between the case where the ignition timing is early and the case where the ignition timing is late. Generally, there is a characteristic that the ignition delay lengthens as the ignition timing becomes more distant from the top dead center. As stated above, generally, the ignition delay is set longer in the rich combustion than in the lean combustion to mix the fuel and the air sufficiently and to suppress the emission of the soot. Accordingly, the control is performed such that the ignition timing differs between the rich combustion period and the lean combustion period. If it is not taken into account that the ignition delay also differs because of the difference in the ignition timing, suitable injection timing cannot be obtained.

Moreover, the ignition delay is affected by existence/non-existence of pilot injection, injection quantity of the pilot injection and injection timing of the pilot injection. The pilot injection is an injection for injecting small quantity of the fuel before main injection. Thus, the pilot injection has an effect of promoting mixing of the fuel and the air before the ignition. If the mixing of the fuel and the air is promoted, the incomplete combustion is inhibited, so the emission of the soot is suppressed. Generally, there is a characteristic that the ignition delay shortens as the pilot injection quantity increases and/or the pilot injection timing comes closer to the main injection.

Thus, the ignition delay increases/decreases in accordance with the ignition timing and the pilot injection. Therefore, unless such the increase/decrease in the ignition delay is taken into account, suitable injection timing cannot be calculated in the state where the in-cylinder oxygen quantity changes suddenly. It can be said that the technology of Patent document 1 merely calculates the injection timing by simply regarding that the ignition delay is constant, without taking the above factors into account.

SUMMARY OF THE INVENTION

It is an object of the present invention to provide a control device of an internal combustion engine capable of calculating a suitable injection timing command value in a state, in which in-cylinder oxygen quantity and the like change suddenly, in accordance with factors such as ignition timing, injection quantity of pilot injection and injection timing of the pilot injection in addition to an air excess ratio.

According to an aspect of the present invention, a control device of an internal combustion engine has an estimating device, a first calculating device and a second calculating device. The estimating device estimates an air excess ratio equivalent value that shows how much present in-cylinder oxygen quantity is larger than in-cylinder oxygen quantity at a theoretical air-fuel ratio in the internal combustion engine. The first calculating device calculates an ignition delay at the air excess ratio equivalent value, which is estimated by the estimating device, from ignition delays in the internal combustion engine at the two or more air excess ratio equivalent values in the internal combustion engine. The second calculating device calculates a command value of fuel injection timing of the internal combustion engine by subtracting the ignition delay calculated by the first calculating device from a target value of ignition timing.

Thus, the control device of the internal combustion engine according to the above aspect of the present invention calculates the ignition delay at the estimated air excess ratio equivalent value from the ignition delays in the internal combustion engine at the two or more air excess ratio equivalent values in the internal combustion engine. The control device calculates the command value of the injection timing of the fuel in the internal combustion engine by subtracting the ignition delay from the target value of the ignition timing. Therefore, the command value of the injection timing of the fuel in the internal combustion engine can be calculated appropriately in accordance with the present air excess ratio equivalent value. Accordingly the control device capable of inhibiting torque fluctuation, unburned HC emission quantity and a noise with the appropriately calculated fuel injection timing even under a situation where the in-cylinder oxygen quantity changes suddenly is realized.

According to another aspect of the present invention, the first calculating device has a first correcting device for calculating the ignition delay by correcting the ignition delay with the target value of the ignition timing.

Thus, the ignition delay is corrected with the target value of the ignition timing, so the difference in the ignition delay due to the difference in the ignition timing can be handled. Accordingly, the fuel injection timing is calculated appropriately by using the corrected ignition delay. Therefore, the control device capable of inhibiting the torque fluctuation, the unburned HC emission quantity and the noise even under the situation where the in-cylinder oxygen quantity changes suddenly is realized.

According to another aspect of the present invention, the first calculating device has a second correcting device for calculating the ignition delay by correcting the ignition delay with at least one of injection quantity and injection timing of pilot injection.

Thus, the ignition delay is corrected with at least one of the injection quantity and the injection timing of the pilot injection, so the difference in the ignition delay due to the difference in the ignition timing can be handled. Accordingly, the fuel injection timing is calculated appropriately by using the corrected ignition delay. Therefore, the control device capable of inhibiting the torque fluctuation, the unburned HC emission quantity and the noise even under the situation where the in-cylinder oxygen quantity changes suddenly is realized.

According to another aspect of the present invention, the control device further has a third calculating device for calculating a target value of the ignition timing at the air excess ratio equivalent value, which is estimated by the estimating device, from the target values of the ignition timing in the internal combustion engine at the two or more air excess ratio equivalent values in the internal combustion engine. The target value of the ignition timing used by the second calculating device is the target value of the ignition timing calculated by the third calculating device.

Thus, the target value of the ignition timing at the air excess ratio equivalent value estimated from the target values of the ignition timing at the two or more air excess ratio equivalent values is calculated. Therefore, the suitable target value of the ignition timing at the present air excess ratio equivalent value can be calculated. Accordingly, the control device capable of inhibiting the torque fluctuation, the unburned HC emission quantity and the noise with the appropriately calculated target value of the ignition timing even under the situation where the in-cylinder oxygen quantity changes suddenly is realized.

According to another aspect of the present invention, the control device further has an exhaust gas recirculation passage for recirculating exhaust gas from an exhaust passage to an intake passage. The estimating device estimates the air excess ratio equivalent value of the internal combustion engine from intake quantity to the intake passage and recirculation quantity of the exhaust gas to the exhaust gas recirculation passage.

Thus, the estimating device estimates the oxygen quantity from the intake quantity to the intake passage and the recirculation quantity of the exhaust gas to the exhaust gas recirculation passage. Therefore, the air excess ratio equivalent value can be estimated with high accuracy. Moreover, the target value of the ignition timing and the ignition delay at the air excess ratio equivalent value can be calculated appropriately by using the accurate estimate of the air excess ratio equivalent value. Accordingly, the control device that can calculate the appropriate injection timing from the appropriate target value of the ignition timing and the appropriate ignition delay and that can inhibit the torque fluctuation, the unburned HC emission quantity and the noise even under the situation where the in-cylinder oxygen quantity changes suddenly is realized.

According to another aspect of the present invention, the estimating device calculates the recirculation quantity of the exhaust gas from difference between gas quantity suctioned into a cylinder of the internal combustion engine and the intake quantity to the intake passage.

According to another aspect of the present invention, the control device further has an exhaust temperature measuring device for measuring exhaust temperature in the exhaust passage and an exhaust pressure measuring device for measuring exhaust pressure in the exhaust passage. The estimating device calculates the gas quantity suctioned into the cylinder of the internal combustion engine from the exhaust temperature measured with the exhaust temperature measuring device and the exhaust pressure measured with the exhaust pressure measuring device.

According to yet another aspect of the present invention, the estimating device calculates the gas quantity suctioned into the cylinder of the internal combustion engine from pressure and temperature in an intake manifold.

The air excess ratio equivalent value can be estimated accurately with the above methods. Moreover, the target value of the ignition timing and the ignition delay at the air excess ratio equivalent value can be calculated appropriately by using the accurate estimate of the air excess ratio equivalent value. Accordingly, the control device that can calculate the appropriate injection timing from the appropriate target value of the ignition timing and the appropriate ignition delay and that can inhibit the torque fluctuation, the unburned HC emission quantity and the noise even under the situation where the in-cylinder oxygen quantity changes suddenly is realized.

BRIEF DESCRIPTION OF THE DRAWINGS

Features and advantages of an embodiment will be appreciated, as well as methods of operation and the function of the related parts, from a study of the following detailed description, the appended claims, and the drawings, all of which form a part of this application. In the drawings:

DETAILED DESCRIPTION OF EXAMPLE EMBODIMENT

Figure 1:
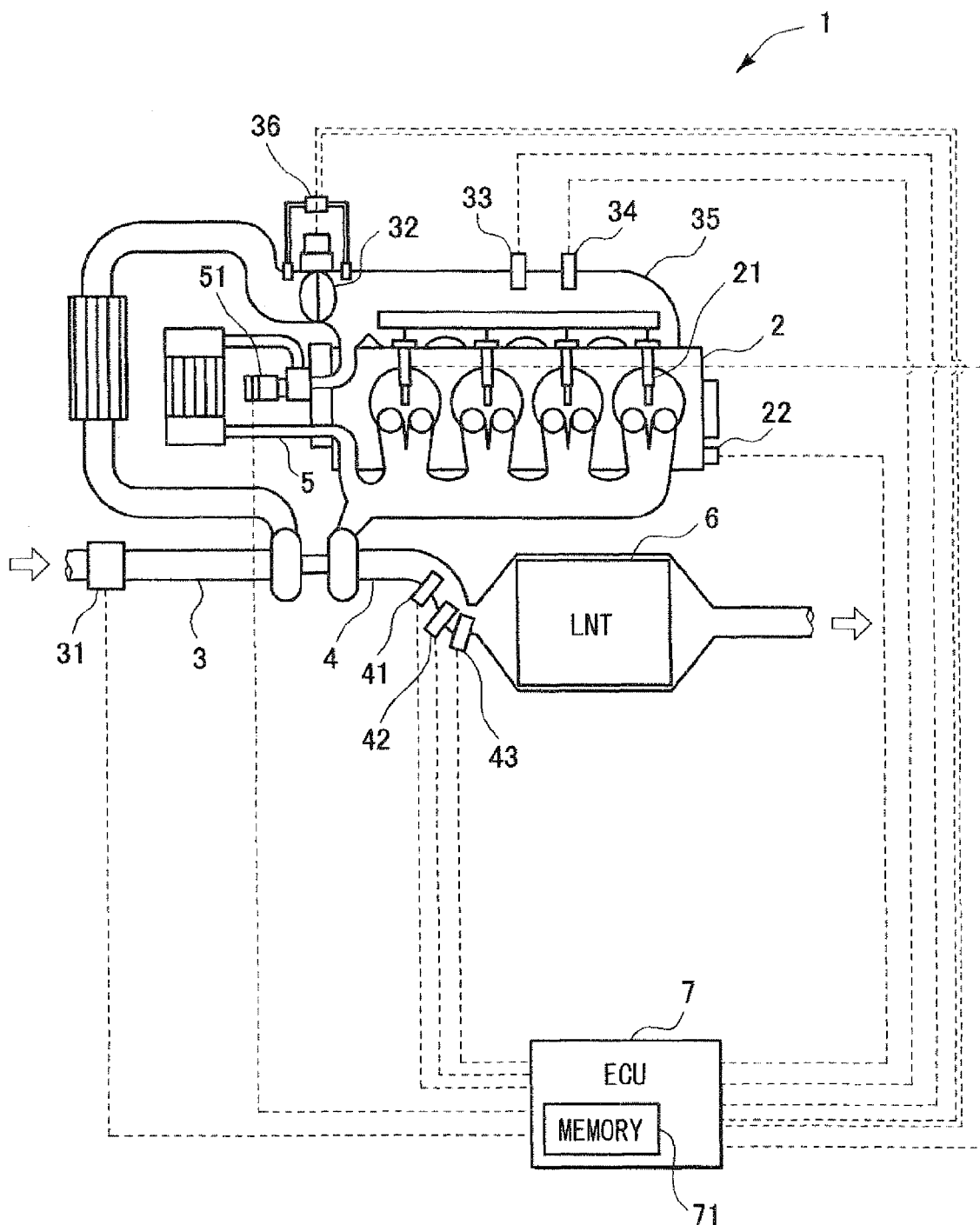
FIG. 1 is a schematic construction diagram showing a control device of an internal combustion engine according to an embodiment of the present invention.

Hereafter, an embodiment of the present invention will be described with reference to the drawings. FIG. 1 is a schematic diagram showing a device configuration of a control device 1 of an internal combustion engine according to the present embodiment.

FIG. 1 shows an example of the control device 1 applied to a four-cylinder diesel engine 2 (hereafter, referred to simply as an engine). The internal combustion engine and the control device 1 shown in FIG. 1 mainly consist of an engine 2, an intake pipe 3, an exhaust pipe 4 and an exhaust gas recirculation pipe 5.

An air (a fresh air, an intake air) is supplied to the engine 2 from the intake pipe 3 via an intake manifold 35. An airflow meter 31 and an intake throttle 32 are provided to the intake pipe 3. The airflow meter 31 measures intake quantity. A mass flow rate per unit time may be measured as the intake quantity.

The intake quantity supplied to the engine 2 is increased/ decreased by regulating an opening degree of the intake throttle 32. An intake pressure sensor 33 and an intake temperature sensor 34 are provided to the intake manifold 35. The intake pressure sensor 33 measures intake pressure in the intake manifold 35. The intake temperature sensor 34 measures intake temperature in the intake manifold 35. A differential pressure sensor 36 is provided across the intake throttle 32. The differential pressure sensor 36 measures differential pressure across the intake throttle 32.

The engine 2 is equipped with injectors 21 and an engine rotation speed sensor 22. Fuel is supplied into a cylinder by injection from the injector 21. The engine rotation speed sensor 22 measures rotation time number of the engine 2 per unit time (i.e., rotation speed). The engine rotation speed sensor 22 may be a crank angle sensor for measuring a rotation angle of a crank connected to the engine 2, for example. The measurement value of the crank angle sensor may be sent to an ECU 7 (electronic control unit) to calculate the engine rotation speed.

Exhaust gas is discharged to the exhaust pipe 4 connected to the engine 2. An A/F sensor 41 an exhaust temperature sensor 42 and an exhaust pressure sensor 43 are provided to the exhaust pipe 4. The A/F sensor 41 measures a value of an air-fuel ratio (A/F). The exhaust temperature sensor 42 measures exhaust temperature. The exhaust pressure sensor 43 measures exhaust pressure.

The exhaust gas recirculation pipe 5 (i.e., the EGR pipe) is used for performing exhaust gas recirculation (EGR) from the exhaust pipe 4 to the intake pipe 3. The EGR pipe 5 is equipped with an EGR valve 51. Exhaust gas recirculation quantity is regulated through opening and closing of the EGR valve 51.

An LNT 6 is arranged in the exhaust pipe 4. For example, the LNT 6 may have a structure, in which a layer of a support is formed on a substrate made of ceramics and an occlusion agent and a catalyst are supported on the support. For example, if the gamma alumina is used as the support, a large volume of the occlusion agent and the catalyst can be suitably supported on a large surface area provided by concavities and convexities on the surface of the support. The barium, the lithium, the potassium or the like may be used as the occlusion agent, and the platinum or the like may be used as the catalyst.

In the LNT 6, NOx in the exhaust gas is occluded to the occlusion agent during a lean atmosphere period, in which the fuel is thinner than the theoretical air-fuel ratio. The A/F value (the air-fuel ratio value) is usually 17 or higher in the lean atmosphere. When the air-fuel ratio is adjusted to a rich atmosphere in which the fuel is excessive as compared to the theoretical air-fuel ratio and a predetermined temperature condition (e.g., a condition that the temperature is equal to or higher than 300 degrees C. to enable the catalyst to function) is satisfied, the NOx occluded in the occlusion agent is reduced by a reducing agent generated from components of the fuel into the harmless nitrogen and discharged. The A/F value is usually 14.5 or lower in the rich atmosphere. A rich combustion method may be used to form the rich atmosphere. In the rich combustion, the intake quantity is decreased and main injection quantity of the injector 21 is increased, thereby forming the rich atmosphere.

The measurement values of the airflow meter 31, the intake pressure sensor 33, the intake temperature sensor 34, the differential pressure sensor 36, the engine rotation speed sensor 22, the A/F sensor 41, the exhaust temperature sensor 42 and the exhaust pressure sensor 43 described above are sent to the ECU 7. The ECU 7 controls timing and injection quantity of fuel injection of the injector 21 to the engine 2 and controls opening degree adjustment of the intake throttle 32 and the EGR valve 51. The ECU 7 may have a structure of an ordinary computer. The ECU 7 may be equipped with a CPU for performing various types of calculation and a memory 71 for storing various types of information.

Figure 2:
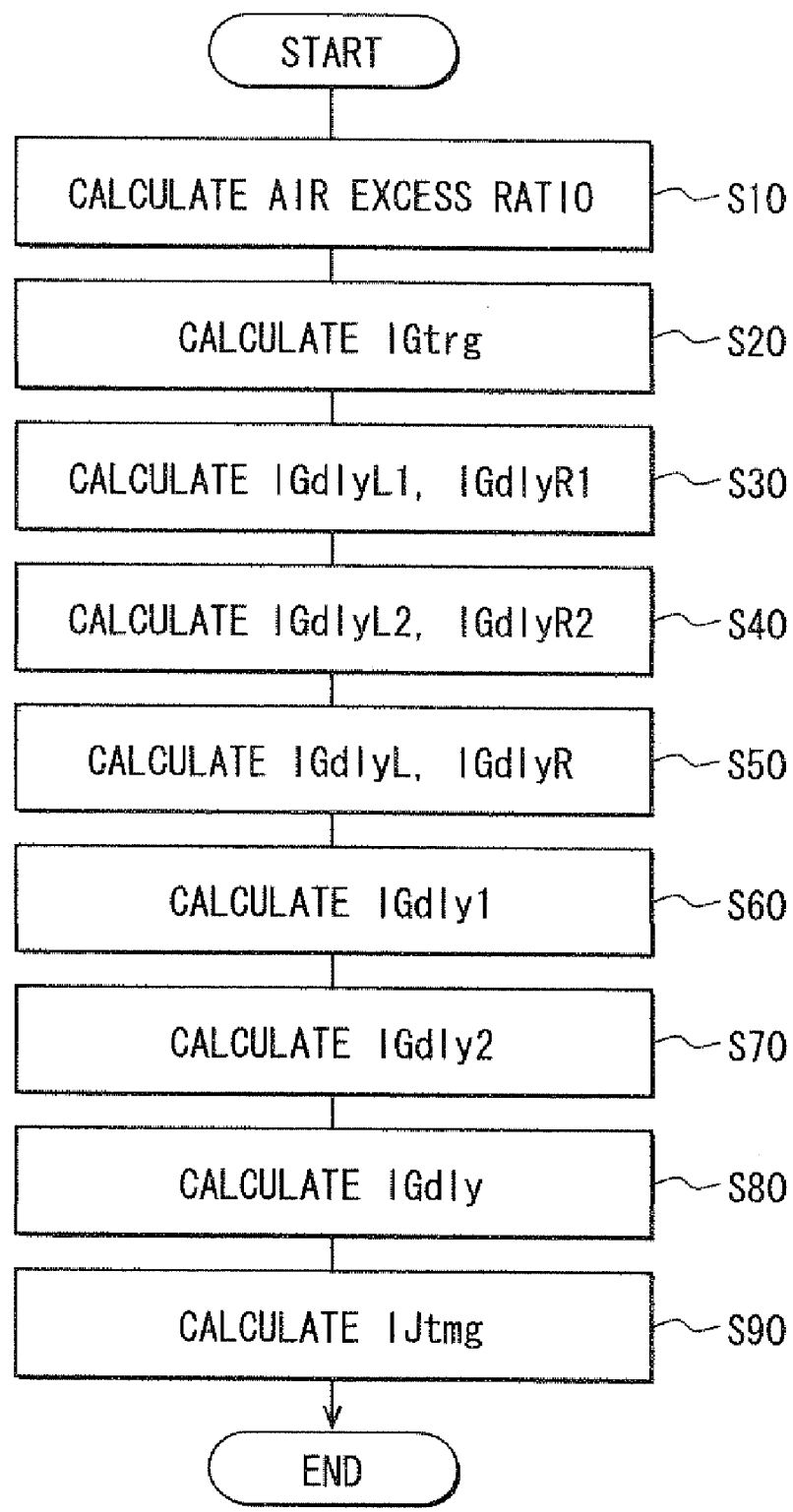
FIG. 2 is a flowchart showing a processing procedure of injection timing calculation according to the embodiment.

In the present embodiment, calculation processing of the fuel injection timing of the injector 21 in a transient state, in which a stationary state of the rich combustion has not been reached yet after switching from the lean atmosphere to the rich atmosphere, is performed in the above-described device construction. A processing procedure of the calculation processing is shown in FIG. 2. The processing shown in FIG. 2 may be performed by the ECU 7 periodically and automatically. A time point when each processing of FIG. 2 is performed is referred to as a present time.

First in S10, the ECU 7 calculates an air excess ratio of the engine 2. The air excess ratio is a ratio of present in-cylinder oxygen quantity (weight) to in-cylinder oxygen quantity (weight) at the theoretical air-fuel ratio in the case where the fuel injection quantity is the same. The present in-cylinder oxygen weight is calculated as the sum of intake oxygen weight suctioned from the intake pipe 3 and recirculated oxygen weight recirculated through the EGR pipe 5. The intake oxygen weight may be calculated by multiplying the weight of the intake air measured with the airflow meter 31 by a ratio of the oxygen weight in the atmosphere (approximately, 21%).

A map for correcting the measurement value of the airflow meter 31 in accordance with the measurement value of the differential pressure sensor 36 may be obtained and stored in the memory 71 beforehand, and the measurement value of the airflow meter 31 may be corrected using the map on the occasion of the calculation of the intake oxygen weight. The calculation method of the recirculated oxygen weight will be explained in detail later.

Figure 6:
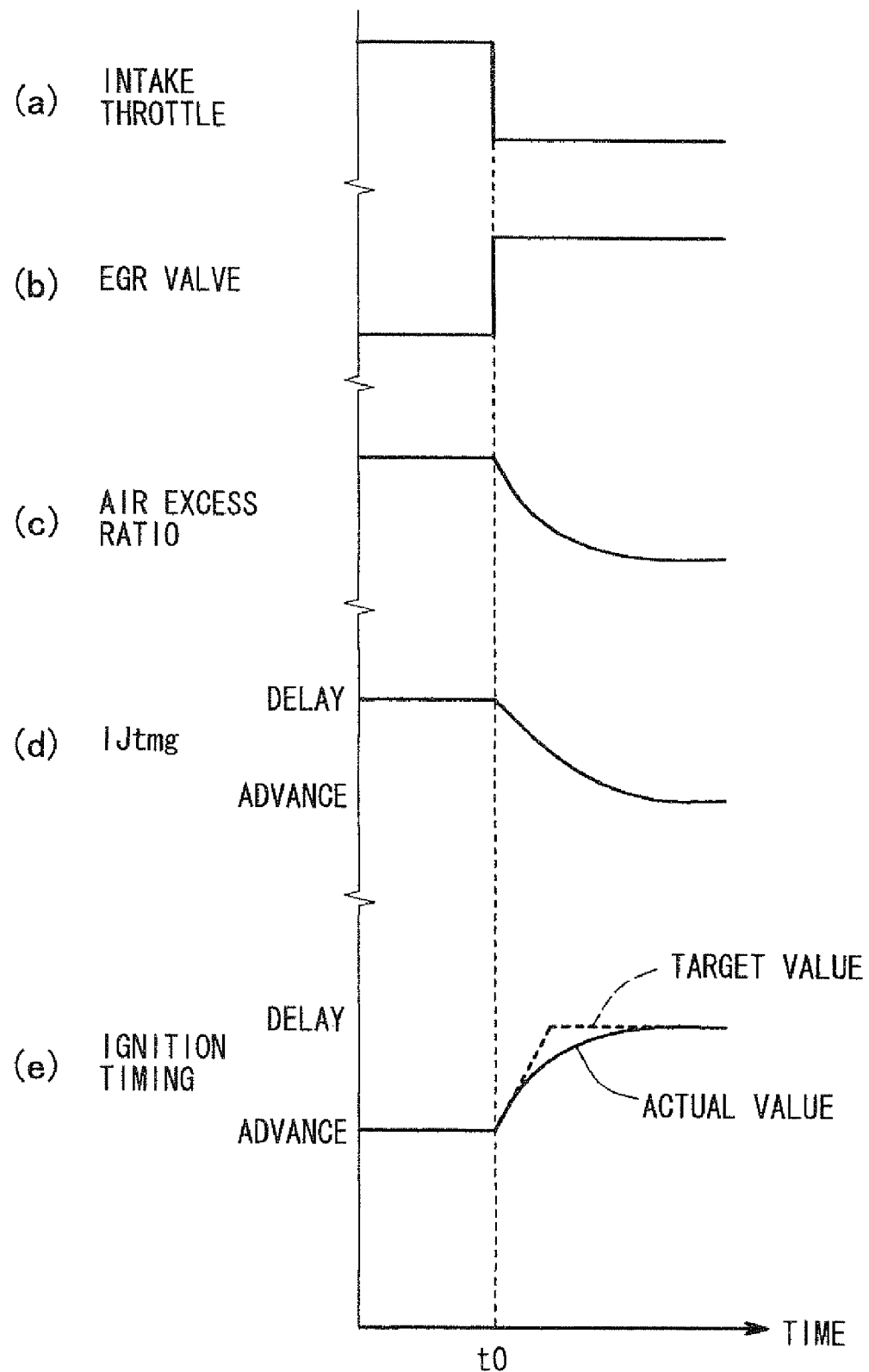
FIG. 6 is a diagram showing temporal transitions of an intake throttle opening degree, an EGR valve opening degree, an air excess ratio, an injection timing command value and ignition timing of a related art.

Then, in S20, the ECU 7 calculates target ignition timing. Generally, the optimum ignition timing varies depending on the air excess ratio for the inhibition of problems such as smoke and a combustion noise. For example, as shown in FIG. 6, the air excess ratio differs between the lean combustion period and the rich combustion period. Accordingly, the target ignition timing is set differently between the lean combustion period and the rich combustion period. Therefore, it is suitable to calculate the target ignition timing in accordance with the air excess ratio of every moment when the air excess ratio is changing every moment in a transient state between the lean combustion and the rich combustion.

According to knowledge of the inventors, there is a relationship of a linear function between the optimum ignition timing and the air excess ratio. Therefore, in S20, a following expression (E1) is used to calculate the target ignition timing IGtrg. In the expression (E1), IGtrg represents the present target ignition timing, IGtrgL is the target ignition timing in the stationary state of the lean combustion, and IGtrgR is the target ignition timing in the stationary state of the rich combustion. O2 represents the present air excess ratio calculated in S10, O2L is the air excess ratio in the stationary state of the lean combustion, and O2R is the air excess ratio in the stationary state of the rich combustion respectively.

$$IGtrg = \{IGtrgR \cdot (O2L-O2) + IGtrgL \cdot (O2-O2R)\}/(O2L-O2R) \quad (E1)$$

IGtrgL, IGtrgR, O2L and O2R may be set and stored in the memory 71 in advance. The expression (E1) shows that the present target ignition timing is calculated by linear interpolation of the target ignition timing in the lean combustion stationary state and the target ignition timing in the rich combustion stationary state. Therefore, it is regarded that the present optimum target ignition timing is calculated as mentioned above.

Then, in S30, ignition delays in the stationary states of the lean combustion and the rich combustion are calculated by following expressions (E2) and (E3). In the expressions (E2) and (E3), IGdlyL1 and IGdlyR1 represent the ignition delays in the stationary states of the lean combustion and the rich combustion respectively. IJtmgL and IJtmgR are injection timings in the stationary states of the lean combustion and the rich combustion respectively. The injection timing may be a command value.

IJtmgL and IJtmgR may be calculated beforehand and stored in the memory 71. Alternatively, IGdlyL1 and IGdlyR1 may be calculated beforehand and stored in the memory 71 instead of calculating IGdlyL1 and IGdlyR1 in S30.

$$IGdlyL1 = IGtrgL - IJtmgL \quad (E2)$$

$$IGdlyR1 = IGtrgR - IJtmgR \quad (E3)$$

Basic concept of the present invention is to calculate the present ignition delay by performing the linear interpolation of the ignition delays in the stationary states of the lean combustion and the rich combustion. However, in some cases, the ignition timing differs between the lean combustion and the rich combustion, and moreover, existence/nonexistence of pilot injection, injection quantity of the pilot injection and/or injection timing of the pilot injection differs between the lean combustion and the rich combustion. According to the knowledge of the inventors, such the differences affect the magnitudes of the ignition delays in the lean combustion and the rich combustion respectively. Therefore, standardization is necessary to remove the difference resulting from the existence/nonexistence of the pilot injection, the injection quantity of the pilot injection and the injection timing of the pilot injection. Therefore, in following S40 and S50, IGdlyL1 and IGdlyR1 calculated in S30 are standardized in accordance with the ignition timing, the existence/nonexistence of the pilot injection, the injection quantity of the pilot injection and the injection timing of the pilot injection respectively.

First in S40, the ECU 7 standardizes IGdlyL1 and IGdlyR1 calculated in S30 with respect to the ignition timing. IGdlyL1 and IGdlyR1 are standardized into IGdlyL2 and IGdlyR2 by following expressions (E4) and (E5) respectively.

$$IGdlyL2 = IGdlyL1/\beta L \quad (E4)$$

$$IGdlyR2 = IGdlyR1/\beta R \quad (E5)$$

Figure 3:
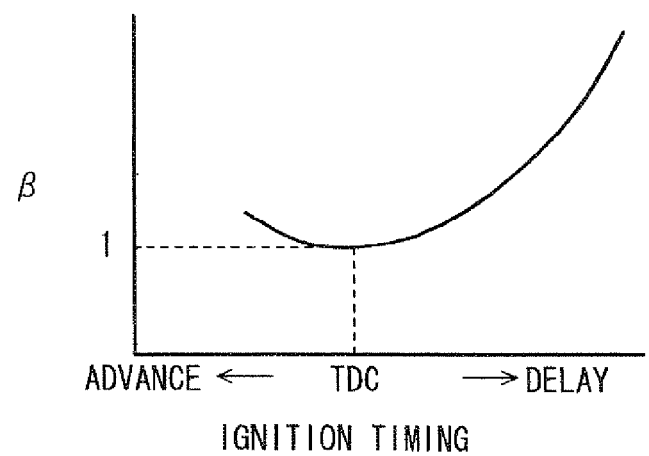
FIG. 3 is a diagram showing a relationship between ignition timing and an ignition delay correction amount according to the embodiment.

$\beta L$ and $\beta R$ in the expressions (E4) and (E5) are calculated from FIG. 3. FIG. 3 is a diagram showing a relationship between the ignition timing and an ignition delay correction amount $\beta$. The ignition delay correction amount $\beta$ is a ratio of the ignition delay at each ignition timing to the ignition delay in the case where the ignition timing is the top dead center (TDC). Generally, as shown in FIG. 3, the ignition delay increases as the ignition timing becomes more distant from the top dead center. $\beta L$ represents a value of the ignition delay correction amount $\beta$ of FIG. 3 at the ignition timing in the stationary state of the lean combustion, and $\beta R$ represents a value of the ignition delay correction amount $\beta$ of FIG. 3 at the ignition timing in the stationary state of the rich combustion. The ignition delays in the stationary states of the lean combustion and the rich combustion are standardized by the expressions (E4) and (E5) into the values in the case where the ignition timing is the top dead center.

Then, in S50, the ECU 7 standardizes IGdlyL2 and IGdlyR2 calculated in S40 with respect to the pilot injection. IGdlyL2 and IGdlyR2 are standardized by following expressions (E6) and (E7) into IGdlyL and IGdlyR respectively.

$$IGdlyL = IGdlyL2/\alpha L \quad (E6)$$

$$IGdlyR = IGdlyR2/\alpha R \quad (E7)$$

Figure 4A:
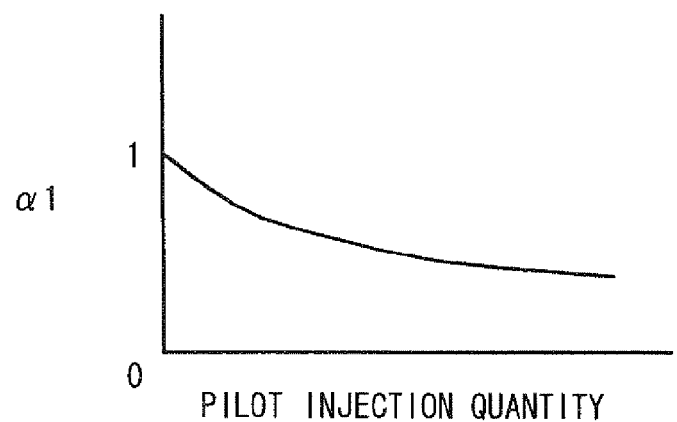
FIG. 4A is a diagram showing a relationship between pilot injection quantity and an ignition delay correction amount according to the embodiment.
Figure 4B:
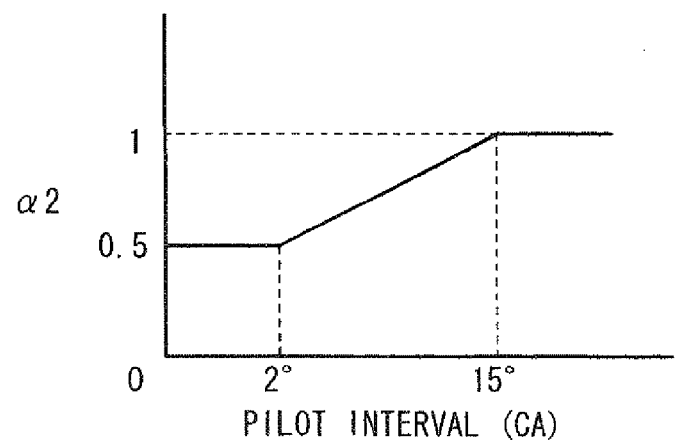
FIG. 4B is a diagram showing a relationship between a pilot interval and an ignition delay correction amount according to the embodiment.

In the expressions (E6) and (E7), $\alpha L$ and $\alpha R$ are calculated using FIGS. 4A and 4B. FIG. 4A is a diagram showing a relationship between the pilot injection quantity and an ignition delay correction amount $\alpha 1$. The ignition delay correction amount $\alpha 1$ is a ratio of the ignition delay at each pilot injection quantity to the ignition delay in the case of a single injection (i.e., in the case where the pilot injection is not performed). Generally, as shown in FIG. 4A, mixing between the fuel and the air before the ignition is promoted more and the ignition delay reduces as the pilot injection quantity increases.

FIG. 4B is a diagram showing a relationship between a pilot interval and an ignition delay correction amount $\alpha 2$. The pilot interval is an interval from the pilot injection to the main injection and is expressed with the angle of the crankshaft (i.e., the crank angle (CA)). The ignition delay correction amount $\alpha 2$ is a ratio of the ignition delay at each pilot interval to the ignition delay in the case where the pilot interval is zero.

Generally, as shown in FIG. 4B, in a range where the pilot interval is shorter than a certain value (15 degrees in FIG. 4B), the ignition delay is small due to the effect of the pilot injection. As the pilot interval increases, the effect of the pilot injection weakens and the effect for shortening the ignition delay reduces. The product of $\alpha 1$ and $\alpha 2$ of FIGS. 4A and 4B is used as an ignition delay correction amount $\alpha$ as shown in a following expression (E8). In the case of the single injection, the ignition delay correction amount $\alpha$ may be set at 1 ($\alpha = 1$) not based on FIGS. 4A and 4B.

$$\alpha = \alpha 1 \cdot \alpha 2 \quad (E8)$$

$\alpha L$ is a value of the ignition delay correction amount $\alpha$ corresponding to the pilot injection quantity and the pilot interval in the stationary state of the lean combustion, and $\alpha R$ is a value of the ignition delay correction amount $\alpha$ corresponding to the pilot injection quantity and the pilot interval in the stationary state of the rich combustion. The ignition delays in the stationary states of the lean combustion and the rich combustion are standardized by the expressions (E6) and (E7) into the values in the case of the single injection.

IGdlyL and IGdlyR obtained as the result of S40 and S50 are values standardized as the values in the case where the ignition timing is the top dead center and the single injection is performed. Therefore, it can be regarded that the difference between IGdlyL and IGdlyR is due to the difference in the air excess ratio. According to the knowledge of the inventors, there is a relationship of a linear function between the ignition delay and the air excess ratio when the factors other than the air excess ratio are constant.

In following S60, the ECU 7 calculates the present ignition delay IGdly1 by a following expression (E9). The expression (E9) shows that the present ignition delay IGdly1 is calculated by the linear interpolation of the ignition delay IGdlyL in the lean combustion stationary state and the ignition delay IGdlyR in the rich combustion stationary state. Therefore, as mentioned above, it is regarded that the optimum ignition delay IGdly1 is calculated by the expression (E9).

$$IGdly1 = \{IGdlyR \cdot (O2L - O2) + IGdlyL \cdot (O2 - O2R)\} / (O2L - O2R) \quad (E9)$$

In the expression (E9), as mentioned above, the ignition delay IGdlyL in the lean combustion stationary state and the ignition delay IGdlyR in the rich combustion stationary state are values standardized as the values in the case where the ignition timing is the top dead center and the single injection is performed. Accordingly, the present ignition delay IGdly1 calculated by the expression (E9) is also the value standardized as the value in the case where the ignition timing is the top dead center and the single injection is performed. Therefore, the present ignition delay IGdly1 calculated in S60 is corrected with the present ignition timing and the pilot injection in following S70 and S80.

First in S70, the ECU 7 corrects the value of IGdly1 with the present ignition timing by a following expression (E10). Thus, the value of the present ignition delay is corrected from IGdly1 into IGdly2. $\beta$ in the expression (E10) is the ignition delay correction amount $\beta$ at the present ignition timing in FIG. 3.

$$IGdly2 = IGdly1 \cdot \beta \quad (E10)$$

Then, in S80, the ECU 7 corrects the value of IGdly2 calculated in S70 with the present injection quantity of the pilot injection and the pilot interval by a following expression (E11). Thus, the value of the present ignition delay is corrected from IGdly2 into IGdly. $\alpha$ in the expression (E11) is the product of the value of the ignition delay correction amount $\alpha 1$ at the present pilot injection quantity in FIG. 4A and the value of the ignition delay correction amount $\alpha 2$ at the present pilot interval in FIG. 4B.

$$IGdly = IGdly2 \cdot \alpha \quad (E11)$$

Thus, in S80, the ignition delay IGdly corresponding to the present ignition timing and the pilot injection is calculated. The present target ignition timing IGtrg is calculated in S20. As is well known, the value calculated by subtracting the ignition delay from the target ignition timing is the injection timing. Therefore, in following S90, the ECU 7 subtracts the present ignition delay IGdly from the present target ignition timing IGtrg as shown by a following expression (E12) to calculate the present injection timing command value IJtmg.

$$IJtmg = IGtrg - IGdly \quad (E12)$$

The above is the processing of FIG. 2.

Figure 5:
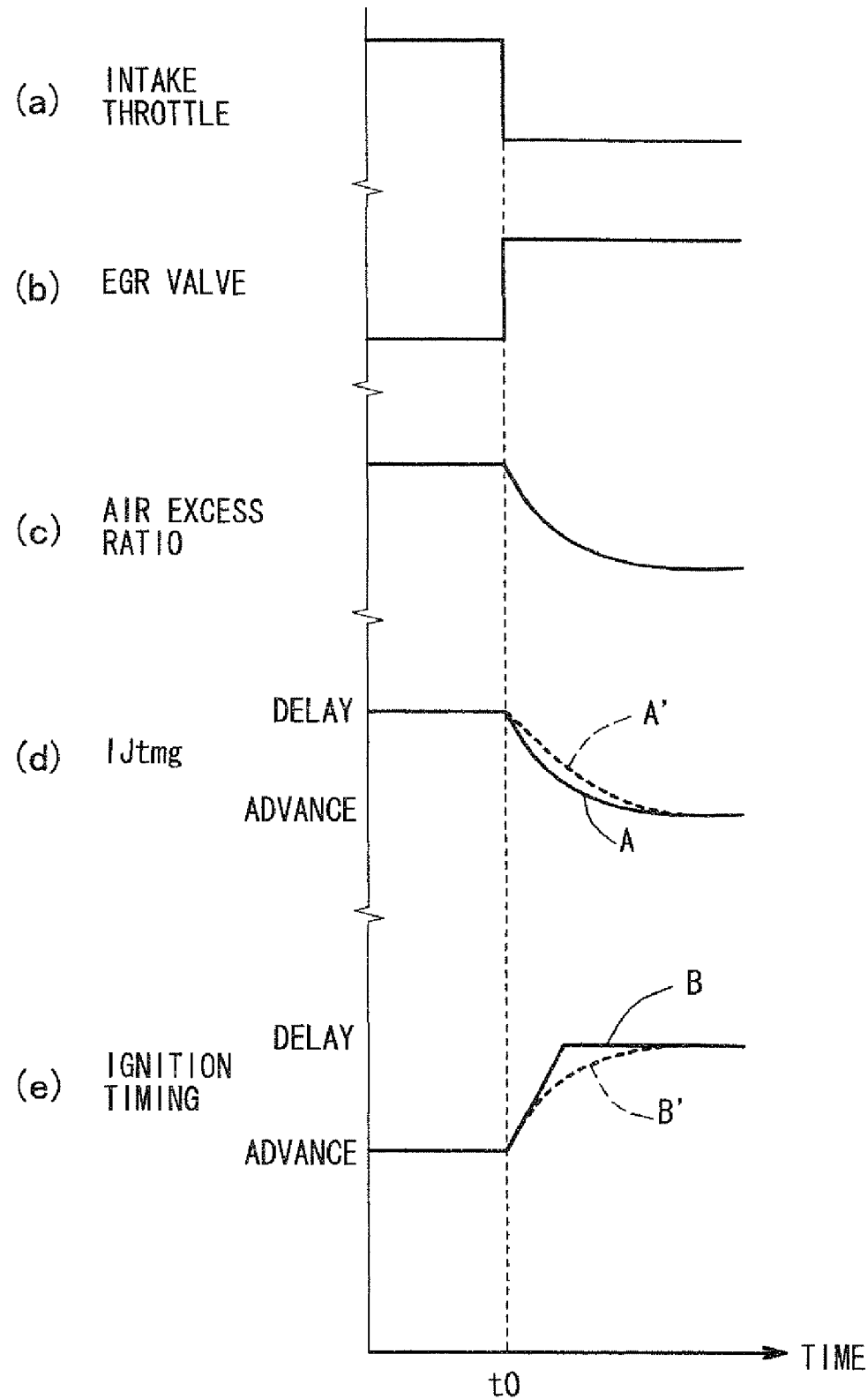
FIG. 5 is a diagram showing temporal transitions of an intake throttle opening degree, an EGR valve opening degree, an air excess ratio, an injection timing command value and ignition timing according to the embodiment.

FIG. 5 shows an example of temporal transitions of (a) the opening degree of the intake throttle 32, (b) the opening degree of the EGR valve 51, (c) the air excess ratio, (d) the injection timing command value and (e) the ignition timing according to the present embodiment. The transitions of (a) the opening degree of the intake throttle 32, (b) the opening degree of the EGR valve 51 and (c) the air excess ratio are the same as those of the conventional technology shown in FIG. 6.

The injection timing command value IJtmg according to the present embodiment shown by a solid line A in part (d) of FIG. 5 is different from the value of a conventional technology shown by a broken line A' as the result of the standardization and the correction related to the ignition timing and the pilot injection performed on the occasion of the linear interpolation in the transient state of switching from the lean combustion to the rich combustion. In addition, because of the difference in the injection timing command value IJtmg, the value of the ignition timing in the transient state of switching from the lean combustion to the rich combustion according to the present embodiment shown by a solid line B in part (e) of FIG. 5 is also different from the value of the conventional technology shown by a broken line B'. The value of the ignition timing according to the present embodiment shown by the solid line B in part (e) of FIG. 5 coincides with the target value shown by the broken line in part (e) of FIG. 6, showing the effect of the present invention.

Hereafter, a calculation method of the recirculated oxygen weight will be explained. The procedure may be performed as follows, for example, as described in JP-A-2002-327634. First, gas quantity flowing into the cylinder is calculated. For the calculation, the intake pressure Pm in the intake manifold 35 is measured with the intake pressure sensor 33. In addition, the intake temperature Tm is measured with the intake temperature sensor 34. The engine rotation speed Ne is measured with the engine rotation speed sensor 22. Then, a volumetric efficiency b is calculated from the engine rotation speed Ne and the intake pressure Pm. For the calculation, a functional relation of the engine rotation speed Ne and the intake pressure Pm to the volumetric efficiency b is calculated beforehand and is stored in the memory 71.

The gas quantity Mcld flowing into the cylinder is calculated using a following expression (E13) from the above numeric values. The expression (E13) is the gas state equation. R represents the gas constant and Vcld is the volume of the cylinder. As shown in the expression (E13), the intake pressure Pm and the intake temperature Tm are used for the calculation of the gas quantity Mcld flowing into the cylinder $$Mcld = Pm \cdot Vcld \cdot b/(R \cdot Tm) \quad (E13)$$

Then, fresh air quantity MDth flowing into the intake manifold 35 is calculated. Therefore, the flow rate Mafm is measured with the airflow meter 31. Difference between the present intake pressure measured with the intake pressure sensor 33 and the intake pressure preceding the present intake pressure by one cycle is calculated as difference ΔP. The fresh air quantity MDth flowing into the intake manifold 35 is calculated using a following expression (E14) from the above numeric values. The expression (E14) expresses the mass conservation in the intake pipe 3. VIN represents the volume of the intake pipe and c is the number of the cylinders.

$$Mafm \cdot 2/c - MDth = \Delta P \cdot VIN/(Tm \cdot R) \quad (E14)$$

Then, the EGR gas quantity flowing into the intake manifold 35 is calculated. The EGR gas quantity Megr flowing into the intake manifold 35 is calculated using a following expression (E15) from the numeric values calculated above. The expression (E15) expresses the mass conservation in the intake manifold 35. As shown in the expression (E15), the EGR gas quantity Megr flowing into the intake manifold 35 is basically the difference between the gas quantity Mcld flowing into the cylinder and the fresh air quantity MDth flowing into the intake manifold 35. The EGR gas quantity Megr is calculated by correcting the difference with a term including ΔP.

$$Megr = Mcld - MDth + \Delta P \cdot Vm/(Tm \cdot R) \quad (E15)$$

Finally, the weight of the oxygen in the EGR gas quantity Megr flowing into the intake manifold 35, which is calculated above, is calculated using the A/F value measured with the A/F sensor 41 provided to the exhaust pipe 4. The calculated value is regarded as the recirculated oxygen weight. The above is the calculation method of the recirculated oxygen weight.

In the above calculation, the gas quantity Mcld flowing into the cylinder may be replaced with the exhaust gas flow rate. In this case, an exhaust gas flow rate sensor may be provided to the exhaust pipe 4 to measure the exhaust gas flow rate. Alternatively, the exhaust gas flow rate may be obtained by correcting the fresh air quantity, which is measured with the airflow meter 31, with the ECU 7 according to the exhaust temperature and the exhaust pressure. The exhaust temperature and the exhaust pressure may be measured with the exhaust temperature sensor 42 and the exhaust pressure sensor 43 respectively.

The processing of FIG. 2 may be performed in a period, in which the stationary state of the rich combustion has not been reached yet, when the combustion is switched from the lean combustion to the rich combustion in the LNT 6 to reduce the NOx occluded in the LNT 6 (i.e., when "rich purge" is performed). The engine 2 and the control device 1 are mounted in the automobile. The processing of FIG. 2 may be performed when an intake system controlled variable deviates from a target value during acceleration. Such the construction can inhibit occurrence of torque step or increase of emission of unburned HC, which can be caused when the in-cylinder oxygen quantity changes suddenly during the rich purge or the acceleration and the ignition timing deviates from the adjusted state.

The air excess ratio is used in the above embodiment but the present invention is not limited thereto. Alternatively, a numeric value equivalent to the air excess ratio may be used. That is, an arbitrary numeric value showing how much the present in-cylinder oxygen quantity is larger than the in-cylinder oxygen quantity at the theoretical air-fuel ratio may be used. For example, the air-fuel ratio, the in-cylinder oxygen concentration or the in-cylinder oxygen weight may be used.

The standardization and the correction based on the ignition timing are performed in S40 and S70 of FIG. 2 but the basis of the standardization and the correction is not limited to the ignition timing. For example, the injection timing may be used. As in the case of the ignition timing, the ignition delay increases/decreases also when the injection timing differs. Therefore, in this case, the above discussion may be modified as follows. First, the horizontal axis of FIG. 3 is changed from the ignition timing into the injection timing. As replacement for the ignition delay correction amount of the vertical axis of FIG. 3, a ratio of the ignition delay at each injection timing to the ignition delay in the case where the injection timing is the top dead center is measured and stored in the memory 71 beforehand. Then, the standardization and the correction of the ignition delay are performed in S40 and S70 based on modified FIG. 3.

In the above-described embodiment, the procedure of S10 and the ECU 7 constitute an estimating device. The procedure of S60 and the ECU 7 constitute a first calculating device. The procedure of S90 and the ECU 7 constitute a second calculating device. The procedure of S20 and the ECU 7 constitute a third calculating device. The procedures of S40 and S70 and the ECU 7 constitute a first correcting device. The procedures of S50 and S80 and the ECU 7 constitute a second correcting device. The exhaust temperature sensor 42 constitutes an exhaust temperature measuring device. The exhaust pressure sensor 43 constitutes an exhaust pressure measuring device.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A control device of an internal combustion engine, the control device comprising:

an estimating means for estimating an air excess ratio equivalent value that shows how much present in-cylinder oxygen quantity is larger than in-cylinder oxygen quantity at a theoretical air-fuel ratio in the internal combustion engine;

a first calculating means for calculating an ignition delay at the air excess ratio equivalent value, which is estimated by the estimating means, from ignition delays in the internal combustion engine at the two or more air excess ratio equivalent values in the internal combustion engine; and a second calculating means for calculating a command value of fuel injection timing of the internal combustion engine by subtracting the ignition delay calculated by the first calculating means from a target value of ignition timing.

2. The control device as in claim 1, wherein the first calculating means has a first correcting means for calculating the ignition delay by correcting the ignition delay with the target value of the ignition timing.

3. The control device as in claim 1, wherein the first calculating means has a second correcting means for calculating the ignition delay by correcting the ignition delay with at least one of injection quantity and injection timing of pilot injection.

4. The control device as in claim 1, further comprising:

a third calculating means for calculating the target value of the ignition timing at the air excess ratio equivalent value, which is estimated by the estimating means, from the target values of the ignition timing in the internal combustion engine at the two or more air excess ratio equivalent values in the internal combustion engine, wherein the target value of the ignition timing used by the second calculating means is the target value of the ignition timing calculated by the third calculating means.

5. The control device as in claim 1, further comprising:

an exhaust gas recirculation passage for recirculating exhaust gas from an exhaust passage to an intake passage, wherein the estimating means estimates the air excess ratio equivalent value of the internal combustion engine from intake quantity to the intake passage and recirculation quantity of the exhaust gas to the exhaust gas recirculation passage.

6. The control device as in claim 5, wherein the estimating means calculates the recirculation quantity of the exhaust gas from difference between gas quantity suctioned into a cylinder of the internal combustion engine and the intake quantity to the intake passage.

7. The control device as in claim 6, further comprising:

an exhaust temperature measuring means for measuring exhaust temperature in the exhaust passage; and an exhaust pressure measuring means for measuring exhaust pressure in the exhaust passage, wherein the estimating means calculates the gas quantity suctioned into the cylinder of the internal combustion engine from the exhaust temperature measured with the exhaust temperature measuring means and the exhaust pressure measured with the exhaust pressure measuring means.

8. The control device as in claim 6, wherein the estimating means calculates the gas quantity suctioned into the cylinder of the internal combustion engine from pressure and temperature in an intake manifold.

\* \* \* \* \*